Aug. 24, 1943.   B. R. BENJAMIN   2,327,853
POWER LIFT MECHANISM FOR TRACTORS
Filed June 30, 1942   2 Sheets-Sheet 1
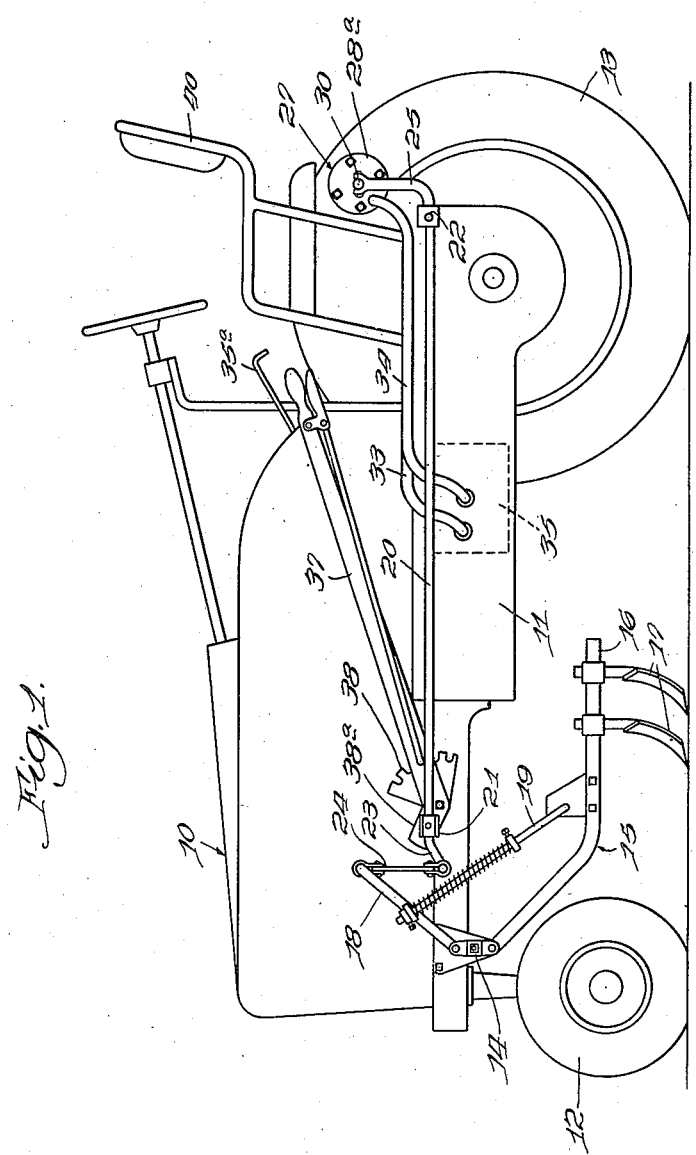
Inventor:
Bert R. Benjamin.
By Paul O. Pippel
Atty.

Aug. 24, 1943.                B. R. BENJAMIN                 2,327,853
                    POWER LIFT MECHANISM FOR TRACTORS
                         Filed June 30, 1942            2 Sheets-Sheet 2
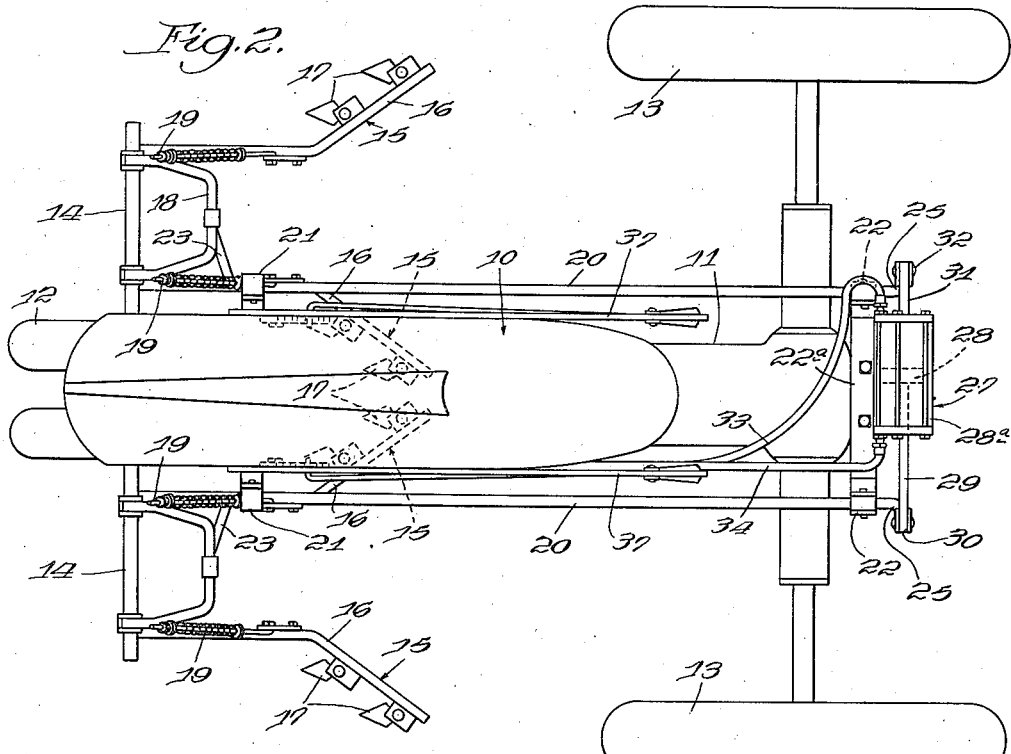
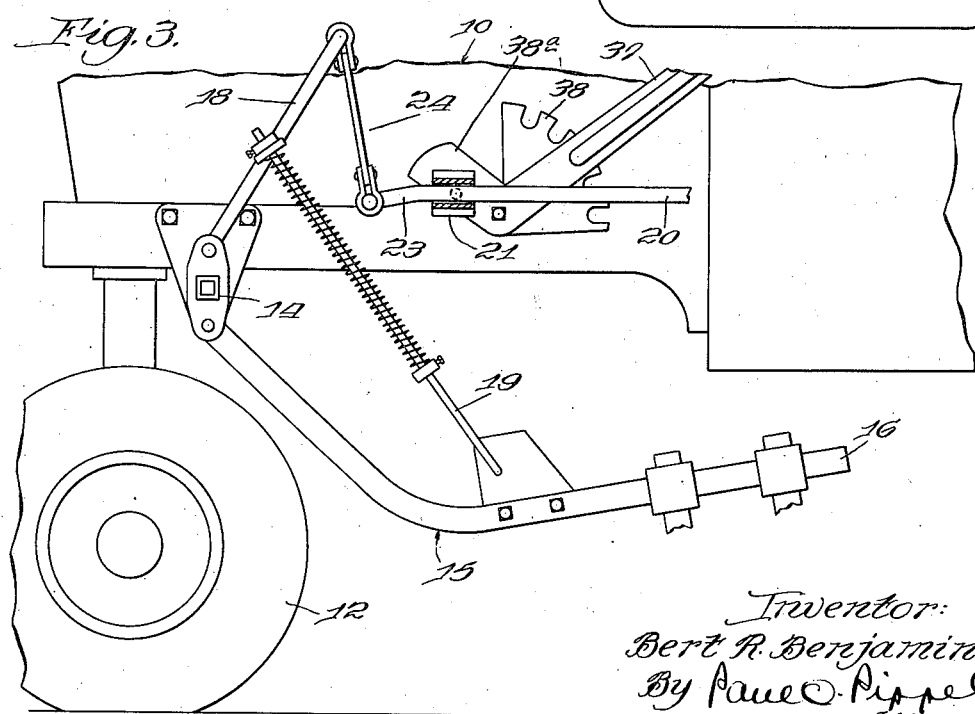
Inventor:
Bert R. Benjamin.
By Paul O. Pippel
    Atty.

Patented Aug. 24, 1943

2,327,853

UNITED STATES PATENT OFFICE 2,327,853

POWER LIFT MECHANISM FOR TRACTORS

Bert R. Benjamin, Oak Park, Ill., assignor to International Harvester Company, a corporation of New Jersey Application June 30, 1942, Serial No. 449,105

12 Claims. (Cl. 97—50)

This invention relates to tractor-mounted agricultural implements, and more specifically it relates to a power-lift attachment therefor.

Heretofore, agricultural implements mounted on tractors have been lifted by means of fluid-pressure cylinders mounted longitudinally at each side of the tractor. It was thus necessary to have a separate cylinder for implements respectively carried at each side of the tractor in order to provide for a well-balanced lift. Not only was it necessary to have separate cylinders, but the cylinders had to be placed at the sides of the tractor in such a manner that they often obstructed the view of the operator and were a continual hindrance to him during operation of the agricultural implement. In order to overcome this failing, applicant has devised a novel means for mounting a fluid-pressure cylinder that will operate to lift implements at the sides of the tractor by means of an effective linkage whereby a well-balanced lift will be obtained and whereby said fluid-pressure device is strategically positioned with respect to the operator's activities during the operation of the implement.

It is therefore the principal object to provide a novel means for lifting an agricultural implement mounted on a tractor, and further objects and advantages will become obvious from the following detailed description and structure illustrated in the accompanying drawings, in which:

Figure 1 is a side elevational view of a tractor having implements mounted thereon and the power-lift means of the present invention;

Figure 2 is a plan view of the same construction embodying the invention; and

Figure 3 is an enlarged elevational view of the forward portion of the tractor and of an implement rig, showing the manner in which part of the lifting mechanism is connected to the tractor.

The tractor shown in the drawings is of a well-known construction being generally designated at 10 and having a longitudinally extending body portion 11 carried respectively on front and rear ground wheels 12 and 13.

Carried on the forward portion of the body portion 11 are transversely extending supporting members 14 carrying implement rigs 15 respectively at each side of the tractor 10. The implement rigs 15 include tool-bars 16 pivotally connected to the supporting member 14, said tool-bars having ground-working tools 17 connected thereto and being adapted to be vertically moved to and from a ground-working position.

Lifting levers 18 are pivotally connected to the supporting members 14 and are connected to the tool-bars 16 by means of lifting links 19.

A pair of shaft members 20 are respectively carried at each side of the tractor, said shaft members being rotatably carried at the front portion of the body 11 in bearing members 21. The shaft members 20 extend longitudinally to the rear portion of the body 11, and they are rotatably fastened to said rear body portion by trunnions or bearing members 22 supported on the tractor 10 by a bracket 22a. The shaft members 20 are provided at their front with crank arm portions 23, the outer ends of which are connected by strap members 24 to the lifting levers 18, as indicated at 24a. Vertically extending crank arms 25 are respectively provided at the rear of the shaft members 20.

A floatingly connected, fluid-pressure device 27 is located at the rear of the tractor to extend transversely thereof and includes a piston 28 carried in a cylinder 28a which is connected to the crank arms 25 of one of the shaft members 20 by means of a piston rod 29 as indicated at 30. The fluid cylinder 28a is connected to the other shaft member 20 at the opposite side by means of a bracket 31 connected to the crank arm 25 as shown at 32 in Figure 2. Thus, it will be noted that the fluid-pressure device is completely supported by the shaft members 20.

Conduits 33 and 34 are provided for conveying fluid under pressure to the fluid-pressure device 27 from a reservoir 35 and control mechanism carried in the tractor body 11. This mechanism is operated by means of a control rod 35a accessible to the operator on the tractor. The conduits 33 and 34 are respectively connected at opposite ends of the cylinder 28a.

Fluid is allowed to enter at either end of the cylinder 28a causing the piston 28 to be expanded or collapsed to rotate the shaft members 20 about their longitudinal axes. If fluid enters the cylinder 28a through the conduit 34, the crank arms 23 rotate upwardly exerting pressure on the strap members 24 to pivot the lifting levers in a counterclockwise direction and thereby effect lifting the implement rigs 15. To lower the rigs 15, the process is simply reversed, fluid being admitted under pressure by way of the conduit 33 to expand the device.

Means for manually adjusting the ground-working depth of the implement rigs 15 is provided in the form of manually operable levers 37 pivoted about quadrants 38 respectively connected at each side of the forward portion of the tractor 10. The levers 37 are provided with arms 38a on which the trunnions 21 are supported.

An operator seated on an operator's station 40 of the tractor 10 can adjust the depth of the implement rigs 15 by moving the levers 37 about the quadrants 38, thereby raising or lowering the forward portions of the shaft members 20.

It is, of course, understood that applicant has described and shown only a preferred form of the construction, and he therefore claims as his invention all modifications falling within the appended claims.

What is claimed is:

1. In combination, a tractor having a longitudinally extending body portion, a pair of soil-tilling rigs respectively connected at each side of the tractor for vertical height-changing movement with respect thereto, lifting levers respectively connected at each side of the tractor, lift rods for each rig to connect the same respectively to the lifting levers to cause height-changing movement of said rigs pursuant to pivotal movement of said levers, a pair of longitudinally extending shaft members having crank arms respectively at each end, bearing elements mounted on the tractor for connecting the shaft members at each side of said tractor, force-transmitting members connected respectively to the lifting levers and to the crank arms at one end of the shaft members, and fluid-pressure means at an end of the tractor and respectively connected to the crank arms at the other end of the shaft members for rocking said shaft members about their longitudinal axes to cause the aforesaid pivotal movement of the lifting levers for changing the height of said rigs.

2. In combination, a tractor, a pair of soil-tilling rigs respectively mounted at each side of the tractor for height-changing movement with respect thereto, lifting levers respectively connected at each side of the tractor, lift rods for each rig to connect the same respectively to the lifting levers to cause height-changing movement of said rigs pursuant to pivotal movement of said levers, a pair of longitudinally extending shaft members having crank arms respectively at each end, bearing elements mounted on the tractor for rockably connecting the shaft members respectively at each side of the tractor, means for connecting the lifting levers respectively to the crank arms at the forward ends of the shaft members, and fluid-pressure means at the rear of the tractor and connected respectively to the crank arms at the back ends of the shaft members, to rock the shaft members about their longitudinal axes to cause the aforesaid pivotal movement of the respective lifting levers.

3. In combination, a frame, soil-tilling rigs mounted respectively at each side of the frame for lifting and lowering movement about a horizontal axis directed transversely of the frame, shaft members journaled upon and extending longitudinally of the frame, means connecting respective portions of the shaft members with said rigs to rock the same about their pivotal axes pursuant to rocking movement of said shaft about its axis, and means for rocking said shaft members about their longitudinal axes to lift and lower the said soil-tilling rigs.

4. In combination, an agricultural implement-supporting frame, a ground-working rig mounted on the forward portion of said frame for movement about a horizontal transverse axis to and from a ground-working position, a longitudinally extending shaft journaled on the tractor, means connecting a portion of the shaft to the ground-working rig to lift or lower the same when said shaft is rocked, and means at the rear of the frame and connected at another portion of the shaft for rocking said shaft about its longitudinal axis to cause movement of the implement rig to or from a ground-working position.

5. In combination, an agricultural implement-supporting frame, a ground-working rig mounted on the frame for movement to and from a ground-working position, a lifting lever carried on the frame for pivotal movement about a transverse axis and connected to the ground-working rig to move the same to and from its ground-working position when pivoted, a longitudinally extending shaft journaled on the frame and connected at one end to the lifting lever to pivot the same when rocked, and means connected to the other end of the shaft for bodily rocking said shaft about its longitudinal axis to pivot the lever for so moving the implement rig to or from the ground-working position.

6. In combination, a frame, soil-tilling rigs mounted respectively at each side of the frame for upward and downward movement with respect thereto above horizontal axes extending transversely of the frame, longitudinally extending shaft members carried by the frame for being pivoted about their principal axes, means respectively connecting the shafts with the rigs so as to lift or lower the same when the shafts are pivoted, and a fluid-pressure means floatingly connected between the shaft members transversely with respect to the frame for pivoting said shaft members about their longitudinal axes to cause said movement of the soil-tilling rigs.

7. In combination, a tractor having soil-tilling rigs mounted respectively at each side thereof for movement to and from a ground-working position, rock-shaft members extending longitudinally along the sides of the tractor, means operatively connecting said shafts to the soil-tilling rigs to effect such movement thereof when the shafts are rocked, and a fluid-pressure device mounted to the rear of the tractor and floatingly connected between the shaft members for rocking the same to move the soil-tilling rigs.

8. In combination, a tractor having a longitudinally extending body portion, soil-tilling rigs connected respectively to each side of the tractor and adapted to be moved to and from a ground-working position, rock-shaft members extending lengthwise of and along opposite sides of said body portion, means operably connecting said shafts to the soil-tilling rigs to produce such movement thereof when the shafts are rocked, and a power device located at the rear of the tractor and floatingly connected between the shaft members for rocking the same to move the soil-tilling rigs to and from the ground-working position.

9. In combination, an implement-supporting frame, soil-tilling rigs respectively connected to each side of the frame and adapted to be moved to and from a ground-working position, shaft members extending longitudinally with respect to said frame and respectively connected to the soil-tilling rigs, power means connected between the shaft members for rocking said shaft members about their longitudinal axes to move the soil-tilling rigs, and means connected between the frame and the soil-tilling rigs for adjusting the ground-working depth of said rigs.

10. In combination, a tractor having a longitudinally extending body, soil-tilling rigs respectively connected at each side of the body and adapted to be moved to and from a ground-working position, pivotable shaft members respectively connected to the soil-tilling rigs at each side of the body and extending longitudinally thereof, means connecting the shafts respectively to said rigs to cause such movement thereof when the shafts are pivoted about their longitudinal axes, power means connected between the shaft members and adapted to pivot the same, and means for pivotally securing the shaft members to the tractor including a manually operable mechanism for adjusting a portion of the shafts to effect a change of the ground-working depth of the soil-tilling rigs.

11. In combination, a frame, soil-tilling rigs connected respectively at each side of the frame for upward and downward movement with respect thereto, pivotal shaft members carried by the frame and having one of their respective ends connected to the soil-tilling rigs, means respectively connecting the shafts with said rigs to cause such movement of the rigs in response to pivotal movement of the shafts or lateral adjustment thereof, power means for pivoting said shafts about their longitudinal axes to so move the soil-tilling rigs, and actuating means connected between the frame and the shafts for adjusting the same to thereby effect a change in the ground-working depth of the soil-tilling rigs.

12. In combination, a tractor having a longitudinally extending body portion, a pair of soil-tilling rigs respectively connected at each side of the tractor for vertical movement with respect thereto, lifting levers respectively connected at each side of the tractor, lift rods for each rig to connect the same respectively to the lifting levers, means for vertically moving the rigs comprising a pair of longitudinally extending rock-shaft members having crank arms respectively at each end, bearing elements mounted on the tractor for journaling the shaft members at each side of said tractor while facilitating lateral adjustment of said shaft members, strap members connected respectively to the lifting levers and to the crank arms at one end of the shaft members, fluid-pressure means extending transversely with respect to and at the rear of the tractor and respectively connected to the crank arms at the rearward ends of the shaft members, for rocking said shaft members about their longitudinal axes to move the lifting levers, and actuating means connected between the shaft members and the tractor for laterally adjusting the same to effect a change in the ground-working depth of soil-tilling rigs.

BERT R. BENJAMIN.